United States Patent
Malone et al.

(10) Patent No.: US 12,022,372 B2
(45) Date of Patent: Jun. 25, 2024

(54) EMERGENCY SERVICES COMMUNICATION FOR A PREMISES

(71) Applicant: Comcast Cable Communications, LLC, Philadelphia, PA (US)

(72) Inventors: Mary Malone, Souderton, PA (US); Lisa Weinthal, Ocean, NJ (US); Michael Buttrey, Herndon, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 17/200,561

(22) Filed: Mar. 12, 2021

(65) Prior Publication Data

US 2022/0295252 A1    Sep. 15, 2022

(51) Int. Cl.
*H04W 4/90* (2018.01)
*H04W 4/12* (2009.01)
*H04W 68/00* (2009.01)
*H04W 76/11* (2018.01)
*H04W 76/50* (2018.01)

(52) U.S. Cl.
CPC ........... *H04W 4/90* (2018.02); *H04W 4/12* (2013.01); *H04W 68/005* (2013.01); *H04W 76/11* (2018.02); *H04W 76/50* (2018.02)

(58) Field of Classification Search
CPC ....... H04W 4/90; H04W 4/12; H04W 68/005; H04W 76/11; H04W 76/50; H04W 4/33; H04W 4/021

USPC ........... 455/404.1–404.2, 428, 445, 451–457
See application file for complete search history.

(56) References Cited

U.S. PATENT DOCUMENTS

| | | | | |
|---|---|---|---|---|
| 2008/0118039 A1* | 5/2008 | Elliot | ...................... | H04L 12/66 379/45 |
| 2010/0020942 A1 | 1/2010 | Olshansky et al. | | |
| 2010/0172345 A1* | 7/2010 | Bjorsell | ............ | H04M 3/42331 370/352 |
| 2014/0028783 A1* | 1/2014 | Kaltsukis | ............. | G08B 25/014 348/E7.078 |
| 2015/0163651 A1* | 6/2015 | Tuck | ................. | H04M 3/42357 370/259 |
| 2019/0104393 A1* | 4/2019 | Lhamon | ................. | G08B 25/08 |

OTHER PUBLICATIONS 911.gov, NG911 Guide for Leaders in EMS, https://www.911.gov/projects/ng911-for-public-safety-leaders/ng911-guide-for-leaders-in-ems/, website accessed on Nov. 29, 2022, 3 pages.
CBS News app, 911 to accept text, picture and video messages, article by Chenda Ngak, Aug. 11, 2011, https://www.cbsnews.com/news/911-to-accept-text-picture-and-video-messages/, online article accessed on Nov. 29, 2022, 4 pages.
(Continued)

*Primary Examiner* — Michael Y Mapa
(74) *Attorney, Agent, or Firm* — BakerHostetler

(57) ABSTRACT

Methods and systems for communicating with an emergency service are disclosed. A user device may receive a request to communicate with an emergency service associated with a premises. A communication identifier associated with the premises may be used to identify the user device regardless of the location of the user device to establish communication with the emergency service.

30 Claims, 6 Drawing Sheets

(56) References Cited

OTHER PUBLICATIONS

Intrado, (West.com) E911 FAQS, https://web.archive.org/web/20200806134848/https://www.west.com/safety-services/enterprise-e911-solutions/what-is-e911-faqs/, webpage accessed Nov. 29, 22 via The Wayback Machine, 5 pages.

Kyzivat, [Sip-implementors] Initial INVITE with both audio and image mediadescriptor in SDP, Jul. 2008, 2 pages.

Onsip, What is Enhanced 911 (E911)?, https://www.onsip.com/voip-resources/voip-fundamentals/what-is-enhanced-911-e911, website accessed Nov. 29, 2022, 7 pages.

OOMA home security, Ooma Remote 911 YouTube video accessed online Nov. 29, 2022, https://www.youtube.com/watch?v=GUlaq9vdH9k, 3 pages.

Schulzrinne, Emergency Calling for SIP, last updated Sep. 14, 2011, 4 pages.

Wikipedia, Enhanced 9-1-1, https://en.wikipedia.org/wiki/Enhanced_9-1-1#Location_transmission, webpage accessed Nov. 29, 2022, 16 pages.

\* cited by examiner

EMERGENCY SERVICES COMMUNICATION FOR A PREMISES

BACKGROUND

Emergency services allow for callers to make quick connections with emergency services. Communication networks have a variety of ways to determine the location of a caller to connect a caller with the geographically relevant emergency services. The use of mobile devices, however, creates difficulties in determining user location for an emergency call. Additionally, a caller may be calling regarding an emergency at a different location from where the caller is currently located. Thus, there is a need for more sophisticated techniques for connecting callers with appropriate emergency services.

SUMMARY

Disclosed are methods and systems for communication with an emergency service. A user may indicate, via an application of a user device, a request for an emergency service. The user may indicate that the request for the emergency service be associated with a premises of the user. The user may be away from the premises at the time of the request. A premises system located at the premises may send to the user device premises data, such as an image, video, or other information. The user may view the premises data, as part of a notification or otherwise, and may determine to request the emergency service for the premises. A communication message may be generated using a communication identifier, such as a telephone number, associated with a communication service at the premises. The communication message may be used to establish a communication session between emergency services and a user device that may or may not be located at the premises.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Disclosed are methods and systems for communication with an emergency service. The existing Enhanced 911 emergency services infrastructure may be used to allow a user device, such as a mobile phone, to send an indication to cause emergency services to be sent to a user's premises (e.g., home, building, apartment). The user device may connect to emergency services assigned to the premises. An application running on a mobile phone, or other user device, may be used to send emergency services directly to the user's home, regardless of the location from which the 911 call is placed.

The disclosed techniques allow for the implementation of an additional service for residential customers of FCC compliant telecom companies who already have a telephone service configured at the user's home. The additional service may implemented using an application that allows a user to request emergency services, such as 911, be sent directly to a user's premises (e.g., home, office), even if the user is not at the premises.

The disclosed solution is unique and efficient because the solution does not require any changes to the existing E911 infrastructure already in place. Reliance may be made on the fact that FCC compliant telecoms register the home address for the location of the telephone in automatic number identification (ANI) and/or automatic location identification (ALI) services. User data already retained by telecoms may be used to determine a home telephone number of the user who is logged into the application.

An identifier associated with a premises may be associated with a call from the user device. The identifier may be one that an emergency service uses to geolocate calls placed to the emergency service. The identifier may comprise a home telephone number, a physical address, an identifier associated with a physical address, or a combination thereof. The home telephone number (e.g., or other communication identifier associated with the premises) may be inserted in the FROM TN field in the header of the SIP message for the outgoing call TO 911. The existing ANI/ALI service will return the home address already associated with the FROM TN for routing decisions related to the message, and thus, leverage the existing E911 infrastructure to forward a request for emergency assistance directly to the local Public Service Answering Point (PSAP) for the home address.

Figure 1:
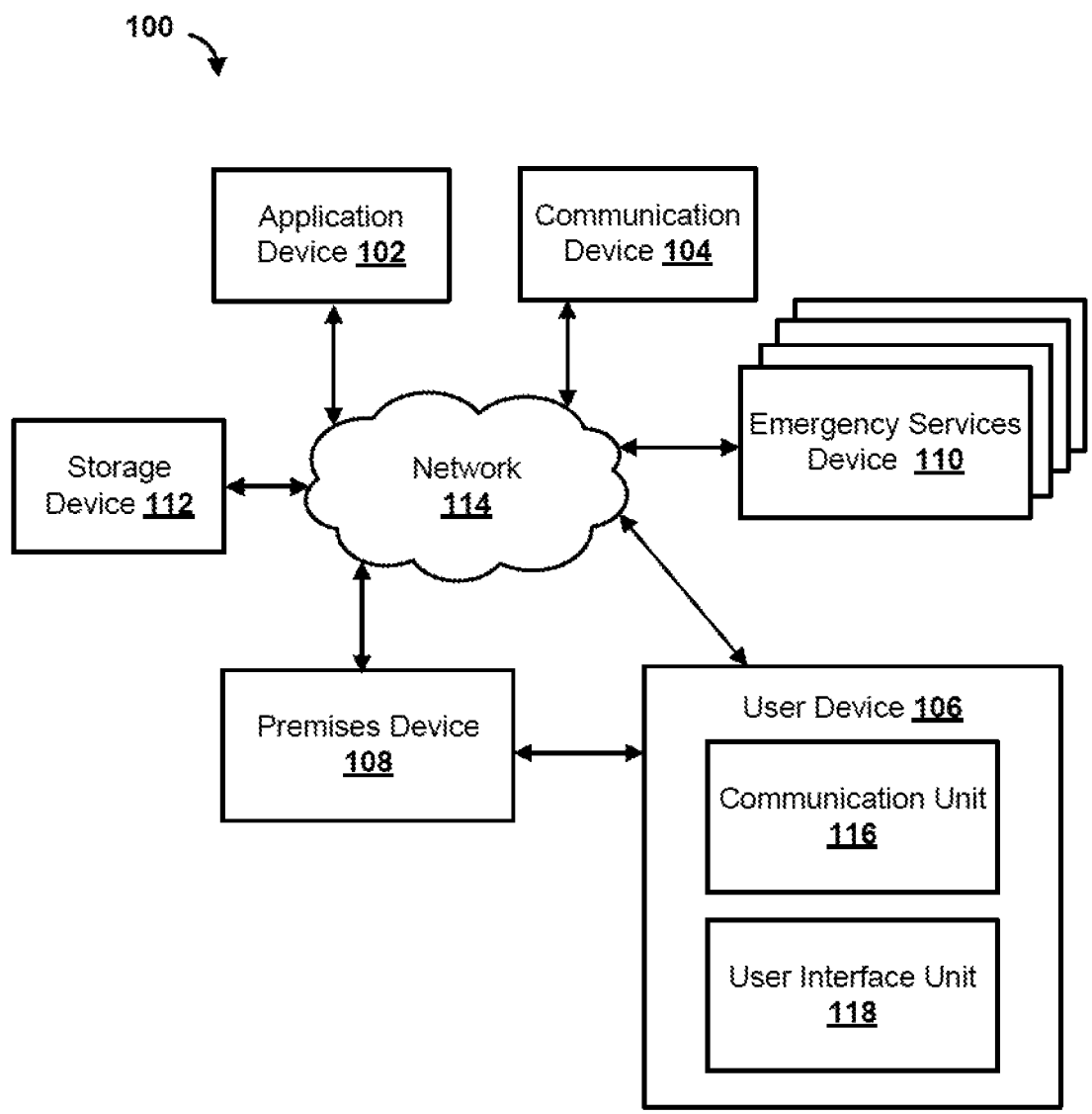
FIG. 1 shows a block diagram of an example system for communication.

FIG. 1 shows a block diagram of an example system 100 for communicating with an emergency service. The system 100 may comprise an application device 102, a communication device 104, a user device 106, a premises device 108, an emergency services device 110, a storage device 112, or a combination thereof. It should be noted while the singular term device is used herein, it is contemplated that a device may be implemented as a single device or a plurality of devices (e.g., via load balancing). The application device 102, the communication device 104, the user device 106, the premises device 108, the emergency services device 110, the storage device 112 may each be implemented as one or more computing devices. Any device disclosed herein may be implemented using one or more computing nodes, such as virtual machines, executed on a single device and/or multiple devices.

The application device 102, the communication device 104, the user device 106, the premises device 108, the emergency services device 110, and/or the storage device 112 may be communicatively coupled via a network 114 (e.g., a local area network, a wide area network, or a combination thereof). The network 114 may comprise a content distribution and/or access network. The network 114 may facilitate communication via one or more communication protocols. The network 114 may comprise fiber, cable, a combination thereof. The network 114 may comprise wired links, wireless links, a combination thereof, and/or the like. The network 114 may comprise routers, switches, nodes, gateways, servers, modems, and/or the like.

The premises device 108 may be located at a premises. The premises device 108 may comprise one or more of a camera, a sensor, a security system, a security controller, a gateway device, a smoke detector, a heat sensor, a door sensor, a motion sensor, a window sensor, a thermostat, a microphone, a personal assistant, a door lock, an irrigation device, or a combination thereof. The premises device 108 may be configured to generate premises data. The premises data may comprise a sensor state, a setting, audio, video, images, text information, premises mode, or a combination thereof. The premises device 108 may be configured to send the premises data to the storage device 112. The application device 102 may be configured to access the premises data from the storage device 112.

The application device 102 may be configured to provide one or more application services. The application device 102 may comprise services for one or more applications on the user device 106. The application device 102 may generate application data associated with the one or more application services. The application data may comprise data for a user interface, data to update a user interface, data for an application session associated with the user device 106, and/or the like. The application data may comprise data associated with access, control, and/or management of the premises. The application data may comprise the premises data, updates to the premises data, and/or the like.

The application device 102 may be configured to determine to send a notification to the user device 106. The notification may be associated with the premises and/or premises device 108. The application device 102 may comprise notification rules associating various values, patterns, and/or the like of the premises data with corresponding notifications. The application device 102 may detect a change in the premises data stored at the storage device 112. The application device 102 may analyze the premises data and determine that a notification rule is triggered. The notification may be sent to the user device 106 based on the notification rule being triggered and/or satisfied. The notification may comprise at least a portion of the premises data, such as an image, video, sensor state (e.g., motion detected, window open, window closed, door open, door closed, temperature, measured particle level, smoke detected, heat detected) and/or the like.

The user device 106 may comprise a computing device, a smart device (e.g., smart glasses, smart watch, smart phone), a mobile device, a tablet, a computing station, a laptop, a digital streaming device, a set-top box, a streaming stick, a television, and/or the like. The user device 106 may be configured to receive the notification via a communication unit 116. The communication unit 116 may comprise a modem, network interface, and/or the like configured for communication via the network 114. The communication unit 116 may be configured to communicatively couple (e.g., via a local area network, a wireless network) the user device 106 to the application device 102, the communication device 104, the premises device 108, the emergency services device 110, the storage device 112, or a combination thereof. In some scenarios, the user device 106 may be configured to communicate with the premises device 108 via the network 114. In this case, the notification may be received directly from the premises device 108. In other scenarios, the user device 106 may be configured to communicate directly with the premises device 108 (e.g., if the user device 106 is located at the premises).

The user device 106 may comprise a user interface unit 118. The user interface unit 118 may comprise an application, service, and/or the like, such as a content browser. The user interface unit 118 may be configured to cause display of a user interface. The user interface may comprise an application (e.g., or be configured to render an application). The user interface unit 118 may receive the application data from the application device 102. The application data may be processed by the user interface unit 118 to cause display of the application. The user interface may be displayed on a display of the user device 106. The display may comprise a television, screen, monitor, projector, and/or the like. The application may comprise a premises management application, a premises automation application, a premises security application, or a combination thereof. The application may be configured to output status information associated with the premises (e.g., status information of the premises device and/or additional premises devices). The application may be configured to allow control of and/or sending commands to the premises (e.g., to the premises device and/or additional premises devices).

The user device 106 may cause output (e.g., via the user interface, via the application) of the notification. The output of the notification may be caused based on receiving premises data from the premises device 108. The application may output one or more user interface elements associated with the notification. The one or more user interface elements may comprise an option to ignore the notification, an option to view premises data associated with the notification, and option to request an emergency service, and/or the like. The one or more user interface elements may comprise a button associated with initiating a call to an emergency service. The one or more user interface elements may be selected, pressed, or otherwise interacted with to select one of the options.

The user device 106 may be configured to determine (e.g., receive) data indicative of a request to initiate communication with an emergency service. The request may be associated with requesting emergency service for the premises (e.g., even if the user is not at the premises). The data indicative of the request may be received via the user interface and/or the application.

The user device 106 may be configured to determine a communication identifier associated with the premises. The communication identifier may comprise a telephone number associated with a communication service configured at the premises. The communication identifier may comprise any other identifier, such as a user name, a domain name, an internet protocol address, a network address, a physical address (e.g., a street address, a zip code, a city) or a combination thereof. The communication service configured at the premises may comprise an audio communication service, a calling service, a telephone service, a voice over interne protocol (VOIP) service, a combination thereof, and/or the like. The communication identifier may be a different communication identifier than the one used by the user device 106 to provide communication, such as audio calls, video calls, and/or other communication sessions.

The communication identifier may be determined based on account information associated with the user device 106. The user device 106 may send a request for a communication identifier to a computing device, such as the application device 102, the premises device 108, an additional network device (not shown), and/or the like. A user may input user credentials into the application. The credentials and/or other session information associated with the credentials may be sent to the computing device with the request for the communication identifier. The user credentials and/or session information may be used (e.g., by the computing device) to determine a user account associated with the user. The user account may have associated account information (e.g., stored by the computing device, stored in a data store), such as a physical address of the premises, an indication of a communication service (e.g., telephone service) at the premises, a communication identifier associated with the communication service (e.g., a telephone number associated with premises), and/or the like. The communication identifier may be received from the computing device. In some scenarios, the communication identifier may be received and stored on the user device 106 prior to receiving the notification. In this scenario, the communication identifier may be determined by accessing local storage on the user device 106.

The user device 106 may be configured to generate (e.g., or determine) a communication message. In some scenarios, the user device 106 may cause another computing device, such as a server, to generate the communication message. The communication message may be generated based on the communication identifier associated with the premises. The communication message may be generated (e.g., or determined) by replacing a communication identifier associated with the user device with the communication identifier associated with the premises. The communication identifier may be stored in a field (e.g., FROM field in a SIP message) of the communication message indicating a sender of the communication message. The communication message may comprise an invite message associated with establishing a communication session. An example invite message may comprise a SIP invite message. A telephone number associated with the premises may be used instead of a telephone number associated with the user device.

The communication message may comprise a SIP message (e.g., SIP INVITE message). The communication message may comprise a TO field value identifying an emergency number (e.g., TO 911). The FROM field of the communication message may comprise the communication identifier (e.g., telephone number) associated with the premises. Any unique user identifier associated with (e.g., stored in a database) the premises may be used to retrieve the communication identifier. The user identifier may be a known userID, custGUID, a media access control (MAC) address for a video camera, and/or the like.

A user may log in to a client application installed on the user device 106 with a username/password established with the service provider. That username (e.g., johndoe2@comcast.net) may be associated with the communication identifier (e.g., telephone number) in a customer database. The username can be used to query the database to determine the premises telephone number. A video camera located at the customer premises may be associated with a unique device MAC address that is stored as data associated with customer account information, including the communication identifier. When an anomalous event is detected by the application device, the unique device MAC address may be used to query the premises communication identifier in the database.

Once the premises communication identifier (e.g., the telephone number) is determined, the client application on the user device 106 may generate and/or cause generation of a standard SIP INVITE in which the FROM TN field comprises the premises communication identifier and the TO TN field comprises 911 (e.g., or other emergency services identifier). The client application may access an application programming interface (API) (e.g., a real time communications API) that is configured to send out the SIP message a communication server, such as an IP multimedia subsystem (IMS) server, a packet switched telephone network (PSTN) server, and/or the like.

The user device 106 may generate the communication message with or without the client application. The user device 106 may be configured to determine that the user is dialing an emergency service. The user device 106 may use the communication identifier associated with the premises instead of a communication identifier associated user device. The communication identifier associated with the premises may be used based on a determination that the call is associated with the premises. If the user device 106 is located at the premises (e.g., connected to a premises router, has a geolocation signal associated with the premises, then the communication identifier associated with the premises may be used. The user device 106 may determine an indication that the call is associated with the premises, such as the user selecting a button indicating the call is located at the premises, a pattern (e.g., user accesses application associated with the premises, user receives a notification associated with the premises), a setting (e.g., user requests that emergency services calls be made using the premises communication identifier, for example during a time period), a combination thereof, and/or the like.

The communication message may comprise the premises data. The premises data may be the premises data received with the notification. The premises data may comprise media content captured at the premises, such as an image, video, audio, status information, a combination thereof, and/or the like. The premises data may be inserted into a field of the communication message. In some implementations, a reference (e.g., link, hyperlink, tiny URL) to the premise data may be inserted into a field of the communication message. The reference may comprise a uniform resource locator for accessing the premises data at a stored location. The reference may be inserted as a media description field of the communication message. The media description field may comprise a media description field of session description protocol (SDP) data in the communication message. The communication message may be processed by the emergency services device 110 (e.g., a SIP user agent at a public-safety answering point (PSAP)).

The premises data may be sent in an additional communication (e.g., message, data, data stream). The original communication message may be used to establish a communication session for transmitting audio, video, data, and/or the like. The additional communication may be sent via the established communication session. The emergency services device 110 may be configured to receive the premises data via the communication session.

In some scenarios, the original communication message may be used to set up a first communication session between the user device 106 and the emergency services device 110. The first communication session may be used for a voice call. A second communication session may be established between the user device 106 and the emergency services device 110. The second communication session may be established while the first communication session is being established and/or used. The second communication session may be used for sending the premises data (e.g., in parallel to the voice data sent in the first communication session).

The original communication message may comprise (e.g., in the body of the SIP message) session description protocol (SDP) data, such as SDP descriptors indicating a setting configured to cause establishment of the second communication session. The SDP data may comprise descriptors for establishing multiple session.

The SDP descriptors in the SIP message may include fields to specify the media type, media setup, and parameter negotiation for communication sessions. The "m" in the SDP payload may be used to describe the premises data and/or communication session for the premises data (e.g., m=audio 49170 RTP/AVP 0; m=video 51372 RTP/AVP 31). The SDP descriptors may be parsed by the emergency services device 110 and/or other devices to cause multiple sessions to be established.

The user device 106 (e.g., or the device caused to generate the message) may be configured to send the communication message. The communication message may be sent based on (e.g., in response to) the request. The communication message may be sent to the communication device 104. The communication device 104 may be a device configured to facilitate communication sessions between devices using the network 114. The communication session may comprise audio, video, text, and/or other types of communication. An example communication session may comprise a telephone-based audio communication session. The communication device 104 may comprise a proxy server, a redirect server, a registrar, a session border controller, a gateway, and/or the like. The communication device 104 may comprise a device for enabling communication based on session initiation protocol. The communication device 104 (e.g., and other network devices) may be configured to route the communication message to a destination.

The communication message may be routed to the emergency services device 110. The emergency services device 110 may be one of a plurality of emergency services devices 110 geographically dispersed in or more regions. The communication message may be routed to the emergency services device 110 based on an association of the communication identifier and a physical address of the premises. The communication message may be routed to the emergency services device 110 based on an association of the emergency services device 110 with a geographic region comprising the physical address. The emergency services device 110 may be located in the geographic region. The emergency services device 110 may comprise a public-safety answering point configured to determine the physical address based on an automatic location identification (ALI) database.

The emergency services device 110 may receive the communication message. The emergency services device 110 may respond to the communication message to establish a communication session. An agent, such as an emergency services agent may be connected to the user of the user device 106. The emergency services device 110 may cause the premises data to be output (e.g., displayed) to the agent. The location of the premises may be output to the agent (e.g., even though the user device 106 may or may not be located at the premises). The agent may dispatch emergency services personal in the region in which the premises is located to provide emergency services to the premises.

Figure 2:
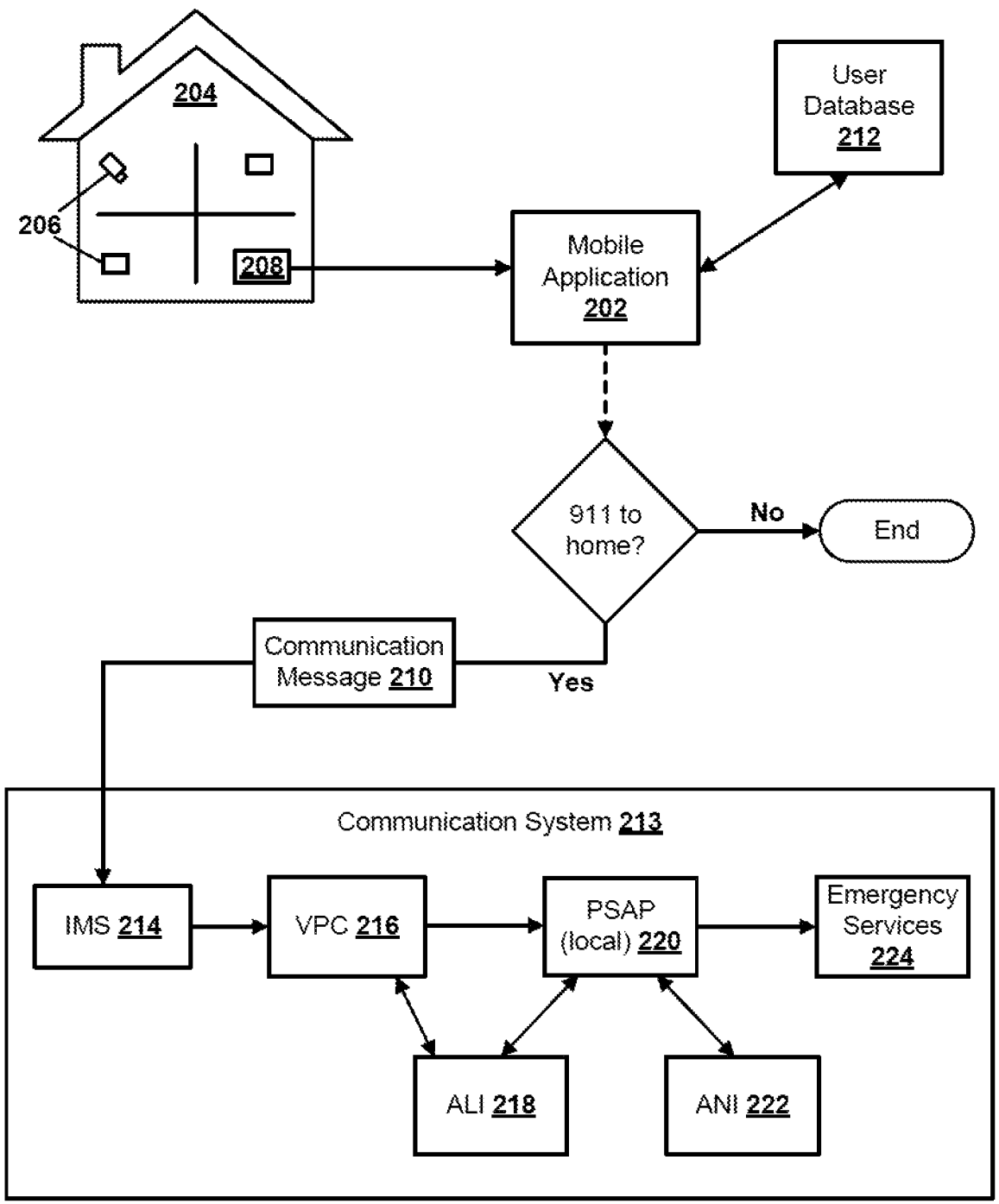
FIG. 2 shows a block diagram of an example process for communication.

FIG. 2 shows a block diagram of a process for communicating with an emergency service. An application 202, such as a mobile application, may be installed on a user device. The user device may receive interactions from a user. The application 202 may receive the interactions from a user. An interaction may indicate that the user is requesting an emergency call, such as a 911 call. The user may request the emergency call at any time. In some scenarios, the emergency call may be requested based on a notification associated with a premises 204 associated with the user. The premises 204 may comprise one or more premises devices 206. The one or more premises devices 206 may comprise and/or be configured to communicate with a gateway device 208. The gateway device 208 may receive status information, such as sensor state changes, sensor measurements, and/or other data.

The gateway device 208 may comprise notification rules that associate sensor values, trends, patterns, and/or other status information with corresponding types of notifications (e.g., and which devices to notify). A notification rule may associate a notification to a user device with values, trends, patterns, and/or other status information. The notification rules may be used defined, computer defined, and/or a combination thereof. The notification rules may be logical rules determined by a machine learning process, neural network, and/or the like. If the notification rule is satisfied, the gateway device 208 may send data indicative of the notification to the user device. The data may be sent via a server associated with the application. In some scenarios, the server may comprise the notification rule and the gateway device 208 may send the status information to the server to determine if the notification rule is satisfied. The notification may be output via the application 202. The notification may comprise premises data, such as an image, sensor state, video. The user may be given an option to request an emergency call.

The premises devices 206 may comprise home security cameras (e.g., with 24×7 video recording) and video anomaly detection systems (e.g., the gateway device 208 and/or a server configured with notification rules). Unusual or even life-threatening events may be detected at a premises 204 (e.g., while a user is at work or somewhere else). Events can be detected such as a home break-in in progress, or facial recognition software may be used to determined that an unknown person is in your home when no one else is there. These unusual or life-threatening events may be captured as images or video clips, and notifications of these events can be sent to a mobile app running on a smart phone. The anomaly detection system (e.g., the gateway device 208, or of a server) may send a notification of the anomaly to the user. The user determines whether to send 911 emergency services directly to the premises 204. And the captured image or video clip associated with the emergency event may be sent in a communication message, such as a SIP message. The captured image or video clip may be sent in a separate stream set up in association with the original SIP 911 call.

If the user requests an emergency call, the application 202 may prompt the user for further information. The application 202 may prompt the user on whether the emergency call is requested for the user's current location, for the user's premises, or a combination thereof. If the user indicates the emergency call is not requested for the home (e.g., by requesting an emergency call for the current location, or denying the request), the process may end or send a message using the communication identifier of the user device. If the user indicated that the emergency call is requested for the premises, then a communication message 210 may be generated by the application 202. The communication message 210 may be generated based on a library, software developer kit (SDK), application programming interface (API) configured to generate the message (e.g., configured to generate SIP messages). The application 202 may send a message to a server to cause the server to generate the communication message 210. The communication message 210 may comprise an invite message, such as a SIP invite message, or other message to initiate a communication session. The communication message 210 may be generated using a communication identifier associated with the premises 204. The application 202 may query a user database 212 for the communication identifier. The user database 212 may comprise entries associating user accounts with corresponding telephone numbers (e.g., or other communication identifiers) a communication service configured at the premises 204. The communication identifier may be inserted in a FROM field of the communication message.

Below is a sample of an outgoing communication message. The communication message may comprise a SIP invite outbound from an IMS platform. The FROM header may comprise the users telephone number (e.g., "+15865418694") associated with the premises outbound from the IMS platform. The TO header may comprise 911. There example fields are shown as follows:

INVITE sip:+19999119039@ims.comcast.netuser=phone SIP/2.0
To: <sip:911@ims.comcast.netuser=phone>
From: <sip:+15865418694@ims.comcast.net>; tag=4d1108-622dc4ec-13c4-50029-58bdc90f-328b1e15-58bdc90f In some implementations, the communication message may comprise data associated with a video clip and/or image (e.g., or other premises data) of an in-progress emergency situation detected at home in the outgoing SIP Message. The data associated with the video clip and/or image may comprise a reference to video clip and/or image, data of establishing a communication session for sending the video clip and/or image, and/or the like. The disclosed techniques may utilize infrastructure for Next Generation 911 (NG911) services that allow users to send digital data to 911 call centers, or public safety answering points (PSAPs). A captured video clip and/or image of an emergency detected at home via a home security camera can be sent in a communication associated with a SIP message in which the FROM header comprises the customer's home telephone number and the TO header is 911. The video clip and/or image may be sent in a communication session initiated based on the SIP message. A SIP INVITE supports sending both audio and image meta descriptors in its SDP. The descriptors may be used to establish a communication session configured to send the video data, image data, and/or other premises data.

The communication message 210 may be sent to a communication system 213. The communication message 210 may be received by an IP multimedia subsystem (IMS) 214 of the communication system 213. The IMS 214 may route (e.g., based on the TO field indicating an emergency service, such as 911) the communication message 210 to a VOIP provisioning center (VPC) 216. The VPC 216 may be configured to query an automatic location identification (ALI) service 218 for a physical address associated with the sender. The communication identifier may be sent with the query. The ALI service 218 may determine a physical address associated with the communication identifier. The ALI service 218 may send the physical address to the VPC 216. The VPC 216 may be configured to route the communication message 210 to a public safety answering point (PSAP) 220 associated with a geographic area. The physical address may be located in the geographic area. The PSAP 220 may be sent the communication message 210 based on the PSAP 220 being associated with the geographic area.

The PSAP 220 may query the ALI service 218 to determine the physical address associated with the communication message 210 (e.g., associated with the communication identifier). The PSAP 220 may receive the physical address from the ALI service 218. The PSAP may send a message to an automatic number identification (ANI) service 222. The ANI service 222 may comprise a service on a display device associated with the PSAP 220 of the telephone number that called 911. The PSAP 220 may use the ANI service 220 to retrieve the physical address location for the communication identifier (e.g., telephone number) from the ALI service 218. The ANI service 218 may act as a callback number if the PSAP 220 loses connection to the distressed caller. The communication identifier (e.g., telephone number of the premises) and/or physical address may be displayed on a device of the PSAP 220. A communication session may be established between the user device and the PSAP. The premises data (e.g., an image, video, sensor state, sensor location) may be displayed on a device of the PSAP 220 (e.g., a device of an assigned operator). An operator at the PSAP 220 may send a message and/or otherwise cause dispatch of emergency services to the physical address. The PSAP 220 may send the premises data to a device associated with the dispatched emergency service and/or service worker.

Figure 3:
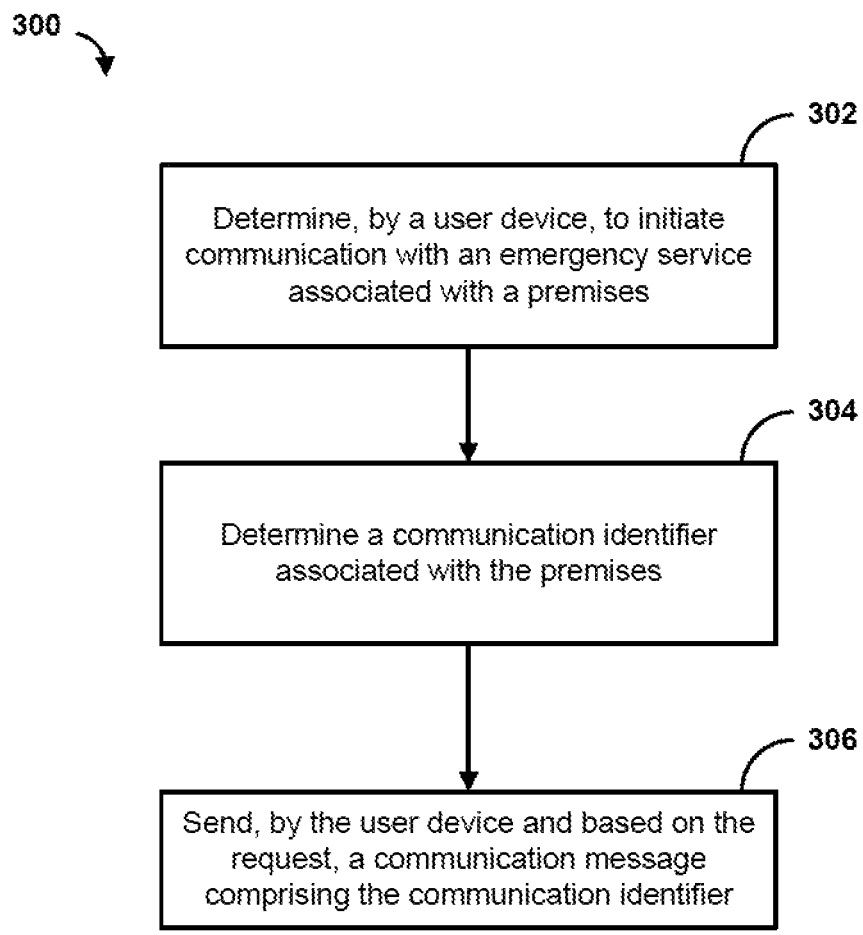
FIG. 3 shows a flowchart of an example method.

FIG. 3 shows a flowchart of an example method. The method 300 may comprise a computer implemented method for providing a service (e.g., a communication service, emergency service). A system and/or computing environment, such as the system 100 of FIG. 1, the devices of FIG. 2 (e.g., premises device 206, gateway device 208, user device, user database 212, IMS 214, VPC 216, ALI service 218, PSAP 220, ANI service 222, Emergency service device 224), or the computing environment of FIG. 6, may be configured to perform the method 300.

At step 302, a determination may be made to initiate communication with an emergency service associated with a premises. A request to initiate communication with the emergency service may be received. The request may be associated with the premises. The determination may be made by a user device (e.g., based on receiving the request). The user device may comprise a mobile device, a cell phone, a smart device, a computer, a tablet, a watch, smart glasses, a combination thereof, and/or the like. The request may be received via a user interface of an application. The user device may be located external to the premises. The user device (e.g., or other device, such as a server, gateway, controller, premises device) may determine that an emergency condition exists at the premises. The user device may determine that the emergency condition exists based on one or more of: receiving a request (e.g., a request to call the emergency service), receiving (e.g., from a server, gateway, premises device) an indication of the emergency condition, analyzing premises data (e.g., a sensor state, a data captured via a sensor), a combination thereof, and/or the like. The determination of the emergency condition may be based on audio, video, sensor state changes, automation rules, and/or the like. A change in a sensor state (e.g., door opening, glass breaking, alarm triggering) may be associated with the emergency condition. Detection of an unrecognized person in video and/or and image may be associated with an emergency condition.

Output of a notification associated with the premises may be caused. Receiving the request to initiate communication with the emergency service may comprise receiving, based on the notification, the request to initiate communication with the emergency service. The notification may be output with a user interface element. The user interface element may be selected, pressed, or otherwise interacted with to cause the data indicative of the request to be sent from the user device. The user interface element may comprise a button associated with initiating a call to an emergency service.

The output of the notification may be caused based on receiving premises data from a premises device located at the premises. The notification may be output via the application. The application may comprise a premises management application, a premises automation application, a premises security application, or a combination thereof. The application may be configured to output status information associated with the premises (e.g., status information of the premises device and/or additional premises devices). The application may be configured to allow control of and/or sending commands to the premises (e.g., to the premises device and/or additional premises devices).

The notification may comprise media content captured at the premises (e.g., or a link to access the media content). The media content may comprise text information (e.g., status information, a sensor state change, a sensor measurement), a picture (e.g., a picture from a camera), a video (e.g., a video captured at the premises), audio (e.g., audio captured at the premises), or a combination thereof.

At step 304, a communication identifier associated with the premises may be determined. The communication identifier may comprise a telephone number associated with a communication service configured at the premises. The communication service configured at the premises may comprise an audio communication service, a calling service, a telephone service, a voice over interne protocol service, a combination thereof, and/or the like.

The communication identifier may be determined based on account information associated with the user device (e.g., or other information associated with the user device). The user device may send a request for a communication identifier to a computing device, such as a computing located external to the premises (e.g., a server device), a computing device located at the premises (e.g., a gateway device, premises device), and/or the like. A user may input user credentials into the application. The credentials and/or other session information associated with the credentials may be sent to the computing device with the request for the communication identifier. The user credentials and/or session information may be used (e.g., by the computing device) to determine a user account associated with the user. The user account may have associated account information (e.g., stored by the computing device, stored in a data store), such as a physical address of the premises, an indication of a communication service (e.g., telephone service) at the premises, a communication identifier associated with the communication service (e.g., a telephone number associated with premises), and/or the like. The communication identifier may be received from the computing device.

At step 306, a communication message may be sent. The communication message may comprise the communication identifier. The communication identifier may be stored in a field of the communication message indicating a sender of the communication message. The communication message may be sent by the user device. The communication message may be sent based on (e.g., in response to) the request. The communication message may comprise data associated with the media content captured at the premises. The data associated with the media content may comprise data for obtaining the media content, a reference to the media content (e.g., accessible via a server), session data for establishing a session to send/receive the media content, and/or the like.

The communication message may be sent to a network device. The communication message may be routed to an emergency services device based on an association of the communication identifier and a physical address of the premises. The communication message may be routed to the emergency services device based on an association of the emergency services device with a geographic region comprising the physical address. The emergency services device may be located in the geographic region. The emergency services device may comprise a public-safety answering point (PSAP) configured to determine the physical address based on an automatic location identification (ALI) database. The PSAP may be configured to determine the physical address based on data stored in the automatic location identification (ALI) database via an automatic number identification (ANI) service.

The communication message may cause establishment of a communication session to support sending the media captured at the premises. The emergency services device may establish (e.g., or participate in establishing), based on the communication message, one or more communication sessions with the user device. The data associated with the media content may be used by the emergency services device to receive the media content and/or establish a communication session to receive the media content.

Figure 4:
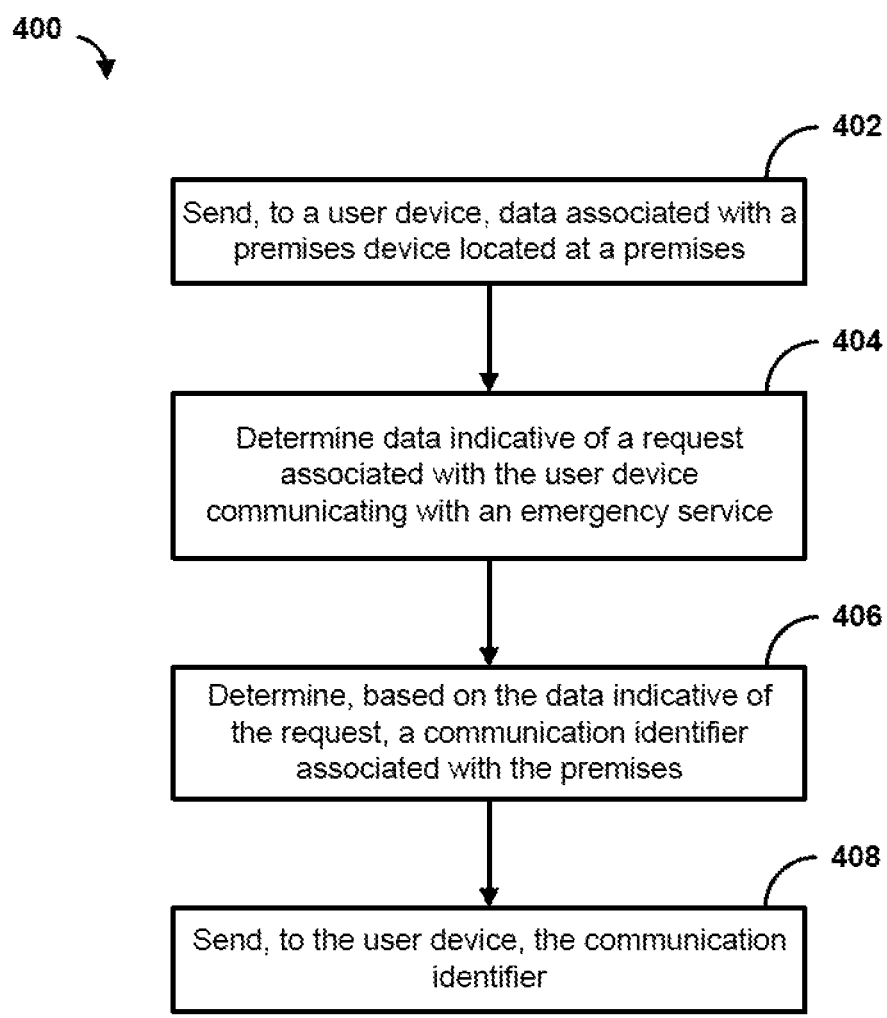
FIG. 4 shows a flowchart of an example method.

FIG. 4 shows a flowchart of an example method. The method 400 may comprise a computer implemented method for providing a service (e.g., a communication service, emergency service). A system and/or computing environment, such as the system 100 of FIG. 1, the devices of FIG. 2 (e.g., premises device 206, gateway device 208, user device, user database 212, IMS 214, VPC 216, ALI service 218, PSAP 220, ANI service 222, Emergency service device 224), or the computing environment of FIG. 6, may be configured to perform the method 400.

At step 402, data associated with a premises device located at a premises may be sent. The data associated with the premises device may be sent to a user device. The user device may comprise a mobile device, a cell phone, a smart device, a computer, a tablet, a watch, smart glasses, a combination thereof, and/or the like. The premises device may comprise one or more of a camera, a sensor, a security system, a gateway device, a smoke detector, a heat sensor, a door sensor, a motion sensor, a window sensor, or a combination thereof. The data associated with the premises device may be sent by a computing device. The computing device may comprise the premises device, a gateway device, a security device, an automation device, a server device, or a combination thereof. The data associated with the premises devices may be sent from the premises device to a server device external to the premises. The server device may send the data associated with the premises device to the user device.

Output of a notification associated with the premises may be caused. The notification may be output via the user device, such as via an application of the user device. The application may comprise a premises management application, a premises automation application, a premises security application, or a combination thereof. The application may be configured to output status information associated with the premises (e.g., status information of the premises device and/or additional premises devices). The application may be configured to allow control of and/or sending commands to the premises (e.g., to the premises device and/or additional premises devices).

The data associated with the premises device may comprise media content captured at the premises. The media content may comprise text information (e.g., status information, a sensor state change, a sensor measurement), a picture (e.g., a picture from a camera), a video (e.g., a video captured at the premises), audio (e.g., audio captured at the premises), or a combination thereof.

At step 404, a determination may be made of a request associated with the user device communicating with an emergency service associated with the premises. The determination may be based on a request from the user device. The user device may send data indicative of a request to communicate with the emergency service associated with the premises. The data indicative of the request may be received. The data indicative of the request may be received from the user device. The data indicative of the request may be received based on (e.g., in response to) the data associated with the premises device.

The user device may determine to communicate with the emergency device. Receiving the data indicative of the request may comprise receiving, based on the notification, the request to initiate communication with the emergency service. The notification may be output with a user interface element. The user interface element may be selected, pressed, or otherwise interacted with the cause the data indicative of the request to be sent from the user device. The user interface element may comprise a button associated with initiating a call to an emergency service. The user device may determine that an emergency condition exists at the premises. The determination of the emergency condition may be based on audio, video, sensor state changes, automation rules, and/or the like. A change in a sensor state (e.g., door opening, glass breaking, alarm triggering) may be associated with the emergency condition. Detection of an unrecognized person in video and/or and image may be associated with an emergency condition.

At step 406, a communication identifier associated with the premises may be determined. The communication identifier associated with the premises may be determined based on (e.g., in response to) the data indicative of the request. The communication identifier may comprise a telephone number associated with a communication service configured at the premises. The communication service configured at the premises may comprise an audio communication service, a calling service, a telephone service, a voice over interne protocol service, a combination thereof, and/or the like.

The communication identifier may be determined based on account information associated with the user device. A user may input user credentials into the application. The credentials and/or other session information associated with the credentials may be received with the data indicative of the request. The user credentials and/or session information may be used to determine a user account associated with the user. The user account may have associated account information, such as a physical address of the premises, an indication of a communication service (e.g., telephone service) at the premises, a communication identifier associated with the communication service (e.g., a telephone number associated with premises), and/or the like.

At step 408, the communication identifier may be sent to the user device. The communication identifier may be sent by the computing device. The communication identifier may be sent based on determining the communication identifier, data indicative of the request to communication, or a combination thereof.

The user device may be configured to use the communication identifier in a communication message. The communication identifier may be stored in a field of the communication message indicating a sender of the communication message. The communication message may comprise data associated with the media content captured at the premises. The data associated with the media content may comprise data for obtaining the media content, a reference to the media content (e.g., accessible via a server), session data for establishing a session to send/receive the media content, and/or the like.

The communication message may be routed to an emergency services device. The communication message may be routed to an emergency services device based on an association of the communication identifier and a physical address of the premises. The communication message may be routed to the emergency services device based on an association of the emergency services device with a geographic region comprising the physical address. The emergency services device may be located in the geographic region. The emergency services device may comprise a public-safety answering point (PSAP). The PSAP may be configured to determine the physical address based on an automatic location identification (ALI) database. The PSAP may be configured to determine the physical address based on data stored in the automatic location identification (ALI) database via an automatic number identification (ANI) service.

The communication message may cause establishment of a communication session to support sending the media captured at the premises. The emergency services device may establish (e.g., or participate in establishing), based on the communication message, one or more communication sessions with the user device. The data associated with the media content may be used by the emergency services device to receive the media content and/or establish a communication session to receive the media content.

Figure 5:
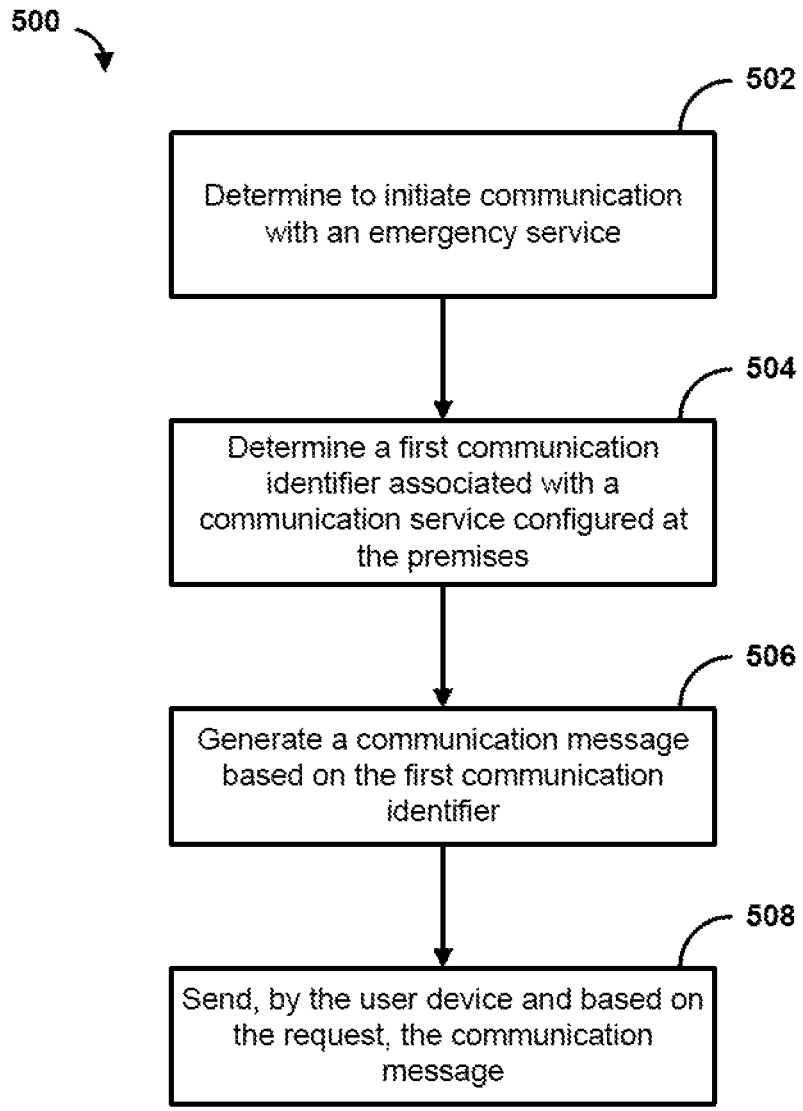
FIG. 5 shows a flowchart of an example method.

FIG. 5 shows a flowchart of an example method. The method 500 may comprise a computer implemented method for providing a service (e.g., a communication service, emergency service). A system and/or computing environment, such as the system 100 of FIG. 1, the devices of FIG. 2 (e.g., premises device 206, gateway device 208, user device, user database 212, IMS 214, VPC 216, ALI service 218, PSAP 220, ANI service 222, Emergency service device 224), or the computing environment of FIG. 6, may be configured to perform the method 500.

At step 502, determination may be made to initiate communication with an emergency service. The determination may be made based on a request. The request to initiate communication with an emergency service may be received via an application of a user device. The user device may be located external to a premises. The user device may comprise a mobile device, a cell phone, a smart device, a computer, a tablet, a watch, smart glasses, a combination thereof, and/or the like. The determination to initiate the communication with the emergency service may be made by the user device (e.g., automatically, based on rules, without user input). The determination to initiate the communication may be based on a determination that an emergency condition exists at the premises. The determination of the emergency condition may be based on audio, video, sensor state changes, automation rules, and/or the like. A change in a sensor state (e.g., door opening, glass breaking, alarm triggering) may be associated with the emergency condition. Detection of an unrecognized person in video and/or and image may be associated with an emergency condition. Detection of the emergency condition and/or a pattern of emergency conditions may be associated with determining to initiate communication with the emergency service. The user device may comprise rules associating various premises data (e.g., video, sensor states, images, audio), user device data (e.g., GPS data, accelerometer data, user device sensor data, pressing an emergency button), and/or the like with corresponding emergency conditions and/or actions. Processing the rules may cause the communication to be initiated with the emergency service. In some scenarios, a notification may be provided to a user that communication with the emergency service is being initiated. The user may have an option to override the communication.

Output of a notification associated with the premises may be caused. The notification may be received via the application. Receiving the request to initiate communication with the emergency service may comprise receiving, based on the notification, the request to initiate communication with the emergency service. The notification may be output with a user interface element. The user interface element may be selected, pressed, or otherwise interacted with the cause the data indicative of the request to be sent from the user device. The user interface element may comprise a button associated with initiating a call to an emergency service.

The notification may comprise media content captured at the premises. The media content may comprise text information (e.g., status information, a sensor state change, a sensor measurement), a picture (e.g., a picture from a camera), a video (e.g., a video captured at the premises), audio (e.g., audio captured at the premises), or a combination thereof. The application may comprise a premises management application, a premises automation application, a premises security application, or a combination thereof. The application may be configured to output status information associated with the premises (e.g., status information of the premises device and/or additional premises devices). The application may be configured to allow control of and/or sending commands to the premises (e.g., to the premises device and/or additional premises devices).

At step 504, a first communication identifier may be determined. The first communication identifier may be determined based on (e.g., in response to) the request. The communication identifier may comprise a telephone number associated with a communication service configured at the premises. The communication service configured at the premises may comprise an audio communication service, a calling service, a telephone service, a voice over internet protocol service, a combination thereof, and/or the like.

The communication identifier may be determined based on account information associated with the user device. A user may input user credentials into the application. The credentials and/or other session information associated with the credentials may be received with the data indicative of the request. The user credentials and/or session information may be used to determine a user account associated with the user. The user account may have associated account information, such as a physical address of the premises, an indication of a communication service (e.g., telephone service) at the premises, a communication identifier associated with the communication service (e.g., a telephone number associated with premises), and/or the like.

At step 506, a communication message may be generated (e.g., or determined). The communication message may be generated by the user device. The communication message may be generated based on the first communication identifier. The communication message may be generated (e.g., or determined) by replacing a second communication identifier associated with the user device with the first communication identifier. The second communication identifier may comprise a telephone number of the user device. The second communication identifier may comprise any unique identifier associated with a user account for a communication service. The second communication identifier may be stored in a database associating the second communication identifier with the first communication identifier.

At step 508, the communication message may be sent. The communication message may be sent by the user device. The user device may cause the message to be sent (e.g., by another device and/or using an application programming interface, such as a real time communication API). The communication message may be sent based on the request. The first communication identifier may be stored in a field of the communication message indicating a sender of the communication message. The communication message may comprise data associated with the media content captured at the premises. The data associated with the media content may comprise data for obtaining the media content, a reference to the media content (e.g., accessible via a server), session data for establishing a session to send/receive the media content, and/or the like.

The communication message may be routed to an emergency services device. The communication message may be routed to the emergency services device based on an association of the first communication identifier and a physical address of the premises. The communication message may be routed to the emergency services device based on an association of the emergency services device with a geographic region comprising the physical address. The emergency services device may be located in the geographic region. The emergency services device may comprise a public-safety answering point (PSAP). The PSAP may be configured to determine the physical address based on an automatic location identification (ALI) database. The PSAP may be configured to determine the physical address based on data stored in the automatic location identification (ALI) database via an automatic number identification (ANI) service.

The communication message may cause establishment of a communication session to support sending the media captured at the premises. The emergency services device may establish (e.g., or participate in establishing), based on the communication message, one or more communication sessions with the user device. The data associated with the media content may be used by the emergency services device to receive the media content and/or establish a communication session to receive the media content.

Figure 6:
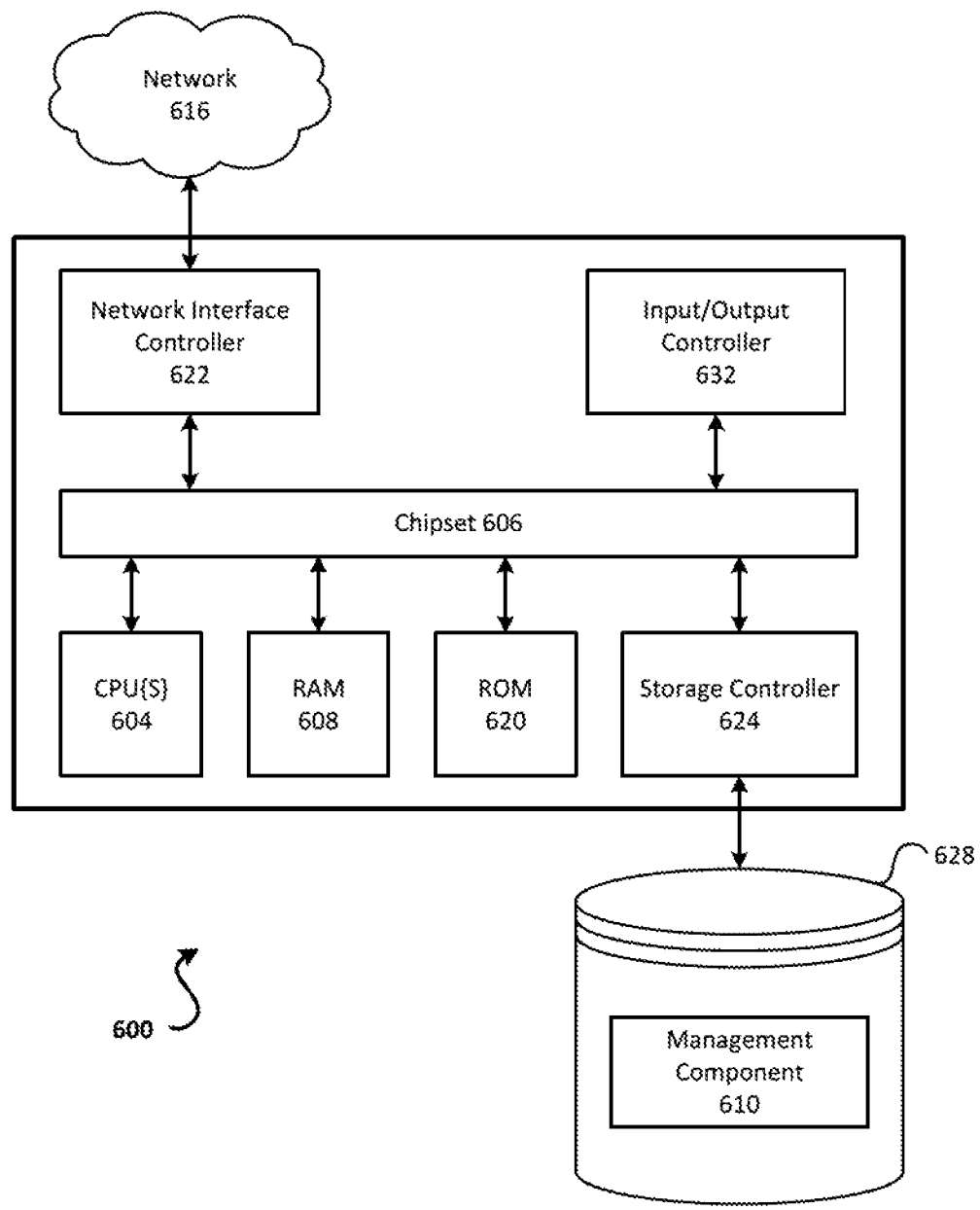
FIG. 6 is a block diagram illustrating an example computing device.

FIG. 6 depicts a computing device that may be used in various aspects, such as the servers, modules, and/or devices depicted in FIGS. 1-2. With regard to the example architecture of FIG. 1, the application device 102, communication device 104, user device 106, premises device 108, emergency services device 110, and storage device 112 may each be implemented in an instance of a computing device 600 of FIG. 6. With regard to the example architecture of FIG. 2, the premises device 206, gateway device 208, user device, user database 212, IMS 214, VPC 216, ALI service 218, PSAP 220, ANI service 222, and emergency service device 224 may each be implemented in an instance of a computing device 600 of FIG. 6.

The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform the methods described in relation to FIGS. 1-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, by a user device located external to a premises and via a user interface of an application, a request to initiate communication with an emergency service associated with the premises;
   receiving, by the user device and based on an association of a user account of the user device with account information, a communication identifier associated with a communication service located at the premises, wherein the account information comprises an indication of the communication service at the premises and the communication identifier comprises a telephone number;
   generating, by the user device and based on an indication of the emergency service being associated with the premises, a communication message comprising the communication identifier associated with the communication service located at the premises; and
   based on the request, sending, by the user device and to a communication device, the communication message comprising the communication identifier, wherein the communication device is caused to determine, based on the telephone number, a location of a physical address of the premises and route the communication message to an emergency service associated with the location.

2. The method of claim 1, wherein sending the communication message causes the communication to be routed to an emergency services device associated with a geographic area comprising the premises.

3. The method of claim 2, wherein the emergency services device comprises a public-safety answering point configured to determine the physical address based on an automatic location identification (ALI) database.

4. The method of claim 1, wherein the telephone number is associated with the communication service located at the premises.

5. The method of claim 1, wherein the communication identifier is stored in a field of the communication message indicating a sender of the communication message.

6. The method of claim 1, further comprising causing output of a notification associated with the premises, wherein receiving the request to initiate communication with the emergency service comprises receiving, based on the notification, the request to initiate communication with the emergency service.

7. The method of claim 1, wherein the communication message comprises data associated with media content captured at the premises.

8. The method of claim 1, wherein the communication device is part of an E911 infrastructure.

9. The method of claim 1, wherein generating the communication message comprises generating the communication message based on inserting the telephone number in a FROM field of the communication message and inserting a 911 identifier in a TO field of the communication message.

10. The method of claim 1, wherein the communication message comprises a SIP invite message addressed to a 911 service.

11. A device comprising:
    one or more processors; and
    memory storing instructions that, when executed by the one or more processors, cause the device to:
      receive, external to a premises and via a user interface of an application, a request to initiate communication with an emergency service associated with the premises;
      receive, based on an association of a user account of the device with account information, a communication identifier associated with a communication service located at the premises, wherein the account information comprises an indication of the communication service at the premises and the communication identifier comprises a telephone number;
      generate, based on an indication of the emergency service being associated with the premises, a communication message comprising the communication identifier associated with the communication service located at the premises; and
      send, based on the request and to a communication device, the communication message comprising the communication identifier, wherein the communication device is caused to determine, based on the telephone number, a location of a physical address of the premises and route the communication message to an emergency service associated with the location.

12. The device of claim 11, wherein the instructions that, when executed by the one or more processors, cause the device to send the communication message comprises instructions that, when executed by the one or more processors, cause the device to cause the communication to be routed to an emergency services device associated with a geographic area comprising the premises.

13. The device of claim 12, wherein the emergency services device comprises a public-safety answering point configured to determine the physical address based on an automatic location identification (ALI) database.

14. The device of claim 11, wherein the telephone number is associated with the communication service located at the premises.

15. The device of claim 11, wherein the communication identifier is stored in a field of the communication message indicating a sender of the communication message.

16. The device of claim 11, wherein the instructions, when executed by the one or more processors, further cause the device to cause output of a notification associated with the premises, wherein the request to initiate communication with the emergency service is based on the notification.

17. The device of claim 11, wherein the communication message comprises data associated with media content captured at the premises.

18. A non-transitory computer-readable medium storing computer-executable instructions that, when executed, cause:
receiving, by a user device located external to a premises and via a user interface of an application, a request to initiate communication with an emergency service associated with the premises;
receiving, by the user device and based on an association of a user account of the user device with account information, a communication identifier associated with a communication service located at the premises, wherein the account information comprises an indication of the communication service at the premises and the communication identifier comprises a telephone number;
generating, by the user device and based on an indication of the emergency service being associated with the premises, a communication message comprising the communication identifier associated with the communication service located at the premises; and
based on the request, sending, by the user device and to a communication device, the communication message comprising the communication identifier, wherein the communication device is caused to determine, based on the telephone number, a location of a physical address of the premises and route the communication message to an emergency service associated with the location.

19. The non-transitory computer-readable medium of claim 18, wherein sending the communication message causes the communication to be routed to an emergency services device associated with a geographic area comprising the premises.

20. The non-transitory computer-readable medium of claim 19, wherein the emergency services device comprises a public-safety answering point configured to determine the physical address based on an automatic location identification (ALI) database.

21. The non-transitory computer-readable medium of claim 18, wherein the telephone number is associated with the communication service located at the premises.

22. The non-transitory computer-readable medium of claim 18, wherein the communication identifier is stored in a field of the communication message indicating a sender of the communication message.

23. The non-transitory computer-readable medium of claim 18, wherein the instructions, when executed, further cause causing output of a notification associated with the premises, wherein receiving the request to initiate communication with the emergency service comprises receiving, based on the notification, the request to initiate communication with the emergency service.

24. A system comprising:
one or more computing devices located at a premises; and
a user device located external to the premises and configured to:
receive, via a user interface of an application, a request to initiate communication with an emergency service associated with the premises;
receive, by the user device and based on an association of a user account of the user device with account information, a communication identifier associated with a communication service located at the premises, wherein the account information comprises an indication of the communication service at the premises and the communication identifier comprises a telephone number;
generate, based on an indication of the emergency service being associated with the premises, a communication message comprising the communication identifier associated with the communication service located at the premises; and
send, to a communication device and based on the request, the communication message comprising the communication identifier, wherein the communication device is caused to determine, based on the telephone number, a location of a physical address of the premises and route the communication message to an emergency service associated with the location.

25. The system of claim 24, wherein the user device is configured to send the communication message to cause the communication to be routed to an emergency services device associated with a geographic area comprising the premises.

26. The system of claim 25, wherein the emergency services device comprises a public-safety answering point configured to determine the physical address based on an automatic location identification (ALI) database.

27. The system of claim 24, wherein the telephone number is associated with the communication service located at the premises.

28. The system of claim 24, wherein the communication identifier is stored in a field of the communication message indicating a sender of the communication message.

29. The system of claim 24, wherein the user device is further configured to cause output of a notification associated with the premises, the user device is configured to receive, based on the notification, the request to initiate communication with the emergency service.

30. The system of claim 24, wherein the communication message comprises data associated with media content captured at the premises.

* * * * *